Oct. 12, 1948. W. DE BOER ET AL 2,451,155
OPTICAL PROJECTION CONTOUR COMPARISON DEVICE
Filed March 23, 1946 2 Sheets-Sheet 1

INVENTOR.
Willes de Boer
Gilbert A. Betts, and
BY Edward C. Polidor

Parker Buckman & Farmer
Attorneys.

Oct. 12, 1948.  W. DE BOER ET AL  2,451,155
OPTICAL PROJECTION CONTOUR COMPARISON DEVICE
Filed March 23, 1946  2 Sheets-Sheet 2

INVENTOR.
Willis De Boer, Gilbert A. Betts
and Edward C. Polidor
BY
Parker, Prochnow & Farmer
Attorneys.

Patented Oct. 12, 1948

2,451,155

UNITED STATES PATENT OFFICE 2,451,155

OPTICAL PROJECTION CONTOUR COMPARISON DEVICE

Willis De Boer, Williamsville, Gilbert A. Betts, Eggertsville, and Edward C. Polidor, Rochester, N. Y., assignors, by mesne assignments, to Precision Methods Co., Inc., Buffalo, N. Y., a corporation of New York Application March 23, 1946, Serial No. 656,596

18 Claims. (Cl. 88—24)

This invention relates to optical comparison devices for ascertaining any deviation of a surface from a standard or desired surface, and particularly to means by which such comparison can be made for surfaces of which a direct silhouette image cannot be formed.

In recent years optical comparison devices for testing the accuracy of manufactured parts have gone into extensive use, with which a part whose accuracy is to be tested, is mounted with a surface or edge thereof extending across a beam of light, and a magnified silhouette of that edge or surface projected upon a screen carrying a magnified chart of the edge or surface which the part or object is supposed to have. Any deviation of the surface or edge from this standard chart on the screen indicates, on a magnified scale, the amount of any inaccuracy with which that particular part of the object is made.

It frequently happens that one may desire to check the accuracy of some surface of an object which is of such a character that no direct silhouette of the surface or edge can be made. For example the jet vanes of jet engines or turbines may vary in curvature in different transverse zones along their lengths which makes it impossible to project a silhouette of the surface at the different zones. It is also frequently desirable to check the accuracy of an internal cavity in an object, where a direct silhouette of the cavity surfaces cannot be obtained.

An object of the invention is to provide an improved optical comparison device by which the accuracy of any regular or irregular surfaces or edges can be measured or checked quickly and easily, even where direct silhouettes of the surface or edge cannot be had; which requires no substantial modification of the construction of present day optical comparison devices; with which contours of relatively large surfaces and edges may be checked rapidly and easily without enlarging the area of the image screen; and with which different surfaces of an object may be checked in rapid succession without remounting the object being checked.

Another object of the invention is to provide an improved optical comparing device by which one may rapidly and easily check the accuracy of regular and irregular surfaces; and which will be relatively simple, compact, accurate and inexpensive.

Another object of the invention is to provide an attachment for existing types of optical comparison devices by which checks on the accuracy of manufactured objects may be made where the surfaces being checked are regular or irregular, or concealed in a manner to prevent direct projection of a silhouette of a surface being checked; and which requires no modification of existing devices.

Another object is to provide an improved construction by which play or looseness in anti-friction or rolling bearings may be taken up and wear compensated for easily and accurately.

Another object is to provide an improved method of easily and rapidly making an accurate optical comparison with a screen chart or drawing, of a selected surface or edge of an object that may be so obscured by other surfaces that prevent a comparison by a direct silhouette of the selected surface, and which will require relatively simple apparatus.

Other objects and advantages will be apparent from the following description of several embodiments of the invention, and the novel features will be particularly pointed out hereinafter in connection with the appended claims.

Figure 2:
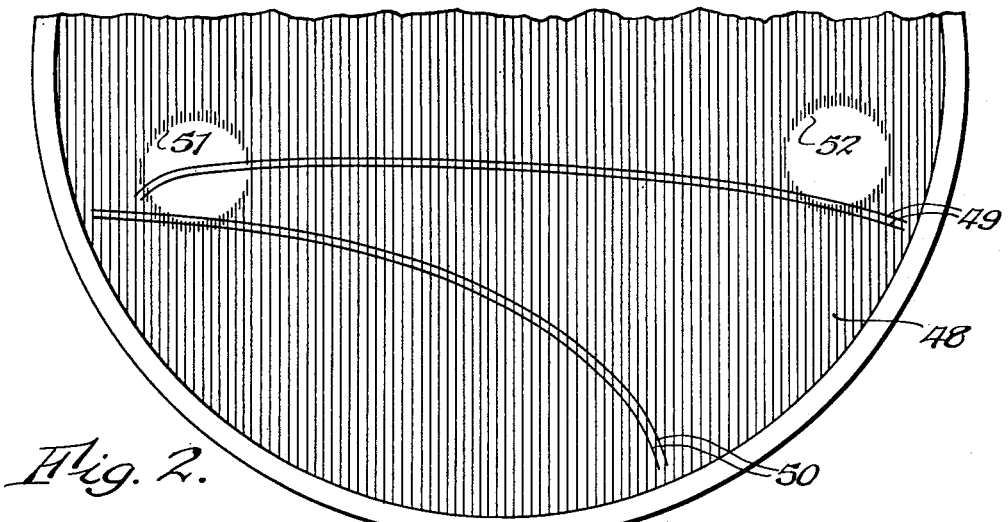
Fig. 2 is a face elevation of part of the screen of the comparing device and illustrating the use of the same.

In the illustrated embodiment of the invention, the table 1 may be the usual table of an optical comparing machine which is mounted to be moved horizontally from side to side, and forwardly and rearwardly, by suitable screws or other operating mechanism. Inasmuch as the table 1 is provided on all of such comparing devices, the mechanism for operating it has not been illustrated. Detachably mounted on the table 1 is a base 2 having ball-bearings 3 in its upper face which provide a rolling bearing for a support 4. The support is provided with suitable uprights or members 5 to serve as a cradle for detachably mounting the object 6 having the surface 7 to be checked. In the illustrated example, the object 6 is a jet vane for a jet engine or turbine which has a curvature in transverse cross section that varies in different transverse strips or zones along the length of the vane, and because of the progressive change in the curvature of different transverse zones along the length of the vane, it is impossible to project a direct silhouette of the surface of any transverse zone of the vane upon the usual comparing screen. The vane or object 6 is mounted with the surface 7 to be checked exposed or uppermost as shown, and with the length of the vane disposed parallel to the direction of travel of the support 4 on the base 2.

Also mounted on the base 2 is a plate 8 (Fig. 4) which extends in a direction crosswise of the support 4 and at its opposite side edges is provided with upstanding arms or side pieces 9 so as to form with the plate 8 a channel-shaped member. The projecting edge portions of the members 9 which form the side walls of the channel are provided on their inside faces with ball-bearing raceways 10. Disposed between the members 9 is a rail 11, having along each of the opposite side edge faces, a raceway 12. Disposed in each of the raceways 10 and 12 at each side of the rail 11 is an anti-friction bearing, such as a ball-bearing 13 provided with a retainer or ball spacer 14.

Figure 1:
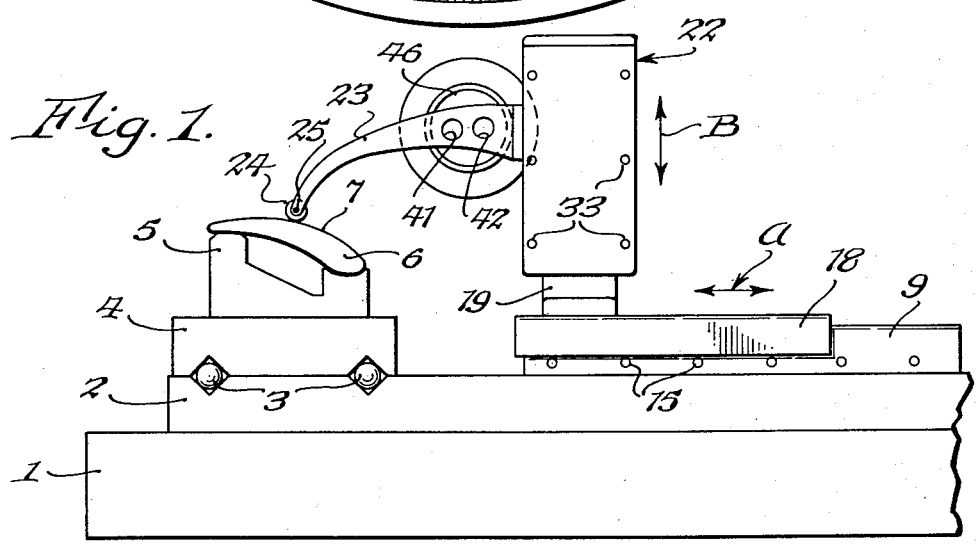
Fig. 1 is a front elevation of the adjustable platform of an optical comparing machine, having mounted thereon an attachment constructed in accordance with this invention.
Figure 5:
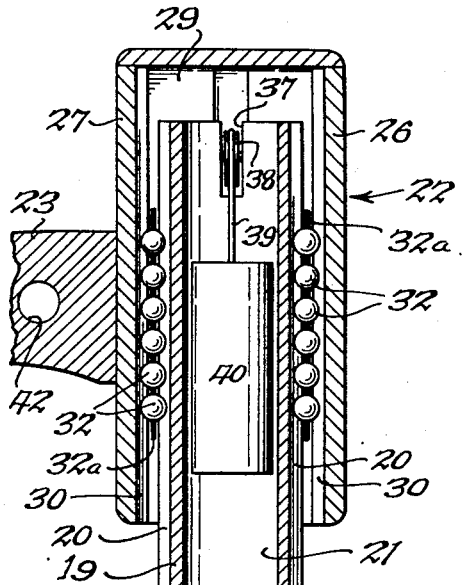
Fig. 5 is a sectional elevation of the same, the section being taken approximately along the line 5—5 of Fig. 4.
Figure 4:
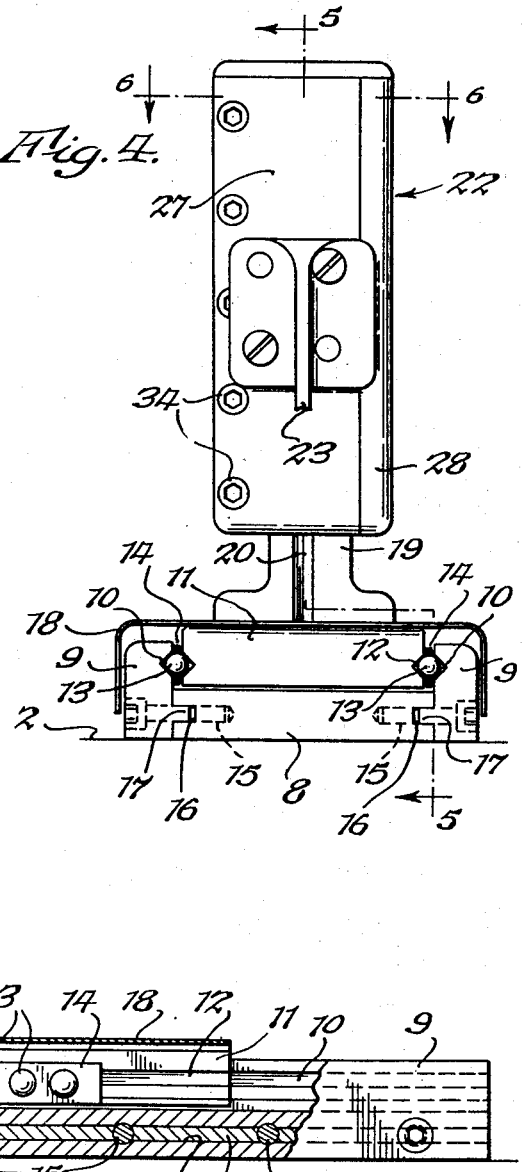
Fig. 4 is an end elevation of part of the mechanism shown in Fig. 1.

The members 9 have their faces that are provided with the raceways 10 abutting against the side edge faces of the plate 8, and are secured thereto by counter-sunk screws 15 which pass through the members 9 into the plate 8. The side edge faces of plate 8 are provided with channels or grooves 16 which extend lengthwise along the side edges, and the abutting faces of the members 9 carry longitudinally extending ribs 17 which slidingly but snugly fit the grooves or channels 16, except that they do not extend to the bottoms of the groove, but terminate some distance therefrom as shown in Fig. 4. By machining off, such as by grinding, the side edge faces of the plate 8 and reapplying the members 9, the distance between the raceways 10 of the members 9 can be decreased to a limited extent so as to take up any play or looseness in the bearings 13 and thus compensate for wear. This makes it possible to eliminate looseness or wear between the rail 11 and plate 8 during their relative movement. The rail 11 is thus mounted for movement back and forth toward the support 4, in the direction of the double ended arrow A (see Fig. 1). A cover plate 18 provided upon the upper face of the rail 11 extends sidewise beyond the members 9 and then downwardly somewhat over the outer faces thereof, approximately to the screws 15, as shown particularly in Figs. 1, 4, and 5.

Upstanding from the rail 11 is a tubular post 19 which is open at its upper end and provided upon opposite side faces with raceways 20 which extend for substantially the full height thereof. Within the post is a chamber 21 for a purpose which will appear shortly. Telescoping loosely over the post 19 is a housing, shell or sleeve 22 having an arm 23 extending laterally therefrom toward the support 4. The free end of the arm 23 carries a follower 24, which is preferably a roller mounted to roll about an axis 25 by which it is pivotally mounted on the arm 23. The sleeve 22, which is hollow, is formed of two end pieces 26 and 27 (Fig. 6) and two side members 28 and 29. The end pieces 26 and 27 extend along the faces of the post 19 which have the raceways 20, and these pieces 26 and 27 have raceways 30 on their inner faces in alignment with the raceways 20. Ball-bearings 32 with retainers or spacers 32a are disposed between each of the pairs of raceways 20 and 30.

Figure 6:
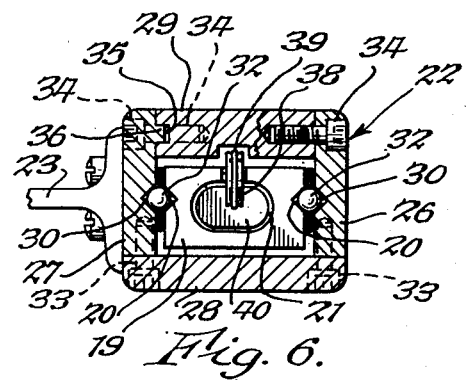
Fig. 6 is a sectional plan of the same, the section being taken approximately along the line 6—6 of Fig. 4.

The end pieces 26 and 27 have their edges abutting against the same side face of the face plate or member 28 and detachably secured thereto by screws 33, see Fig. 6. The plate or member 29, which is opposite from the plate 28, is disposed fully between the corresponding edge portions of the end pieces 26 and 27 so that the side edge faces of plate 29 will abut flat against the inside faces of the end pieces 26 and 27. Screws 34 pass through the end pieces 26 and 27 into the interposed plate 29 to couple the parts together into a rigid structure which is rectangular in transverse cross section and hollow. At least one side edge face of the plate 29 is provided with a groove 35 which extends along the side edge face from end to end, and the abutting face of the end piece 27 is provided with a rib 36 which slidingly and snugly fits the groove 35, but does not extend to the bottom of the same. Instead the groove 36 terminates in substantially spaced relation to the bottom of the groove 35, so that by machining or grinding off the grooved side edge face of plate 29, the rib 36 may be caused to enter deeper into the groove 35, and thus carry the inside face of end piece 27 toward the opposite end piece 26, which decreases the distance between the raceways 30 and 31. In this manner one may tighten the pressure on the ball-bearings 32 sufficiently to eliminate looseness and play between the tubular sleeve 22 and the post 19, and thus compensate for wear as well as facilitate initial assembly of the device without play. This provides an anti-friction bearing by which the sleeve 22 may move vertically on the post 19, in the directions indicated by the double ended arrow B in Fig. 1, and thus carry the roller or follower 24 vertically toward and from the support 4.

The post 19 is provided in a side wall at the top with a notch 37 (Fig. 5) in which is rotatably mounted a sheave 38. A flexible cord 39 passes over the sheave 38, with one end of the cord depending into the hollow chamber 21 of the post and there secured to a weight 40. The other end of the cord 39 passes downwardly between the post and the sleeve 22 and is secured to the sleeve. With this arrangement the weight 40 exerts a lifting force on the sleeve 22 with its arm 23, and thus partially, but not entirely, counterbalances the weight of the sleeve 22 and its arm 23.

The sleeve 22 is provided with one or more sight indexes in the path of the silhouette projection beam of the comparison device, and these indexes are preferably provided on the arm 23 at one side of the post. In the preferred embodiment of the invention, the follower is a roller 24 with a sharp, bevel, slightly rounded, edge so as to follow the surface contour accurately, and each sight index is an aperture in the arm 23, countersunk so that the distance from face to face of the aperture will be small. There are preferably two or more of such apertures, two being shown for an example in the illustrated embodiment of the invention. These sight apertures 41 and 42 are preferably of the same size as the roller 24, and are in planes perpendicular to the axis 25 of the roller 24, or crosswise of the projection beam as will be explained presently. The apertures 41 and 42 are spaced apart in the direction of travel of the post 19 and rail 11 along the plate 8, and may be at the same or different levels above the base 1. From this it will be observed that when the parts are assembled in the relation shown in Fig. 1, the roller 24 will be in a position to roll on the surface 7 as the carriage post 19 moves in the direction of the double ended arrow A in Fig. 1, and as it moves in these directions, the roller 24 will roll along and in contact with the surface 7 to be checked in a direction transverse to the vane 6. During this movement the roller 24 will be urged yieldingly and continuously into contact with the surface 7 by the weight of the sleeve 22 and arm 23, and thus the sight openings 41 and 42 will partake of movements similar in size and direction to the movement of the roller 24 over the surface 7. As the roller 24 moves from one edge of the surface 7 to the other, the apertures 41 and 42 will move in succession across the projection beam of light as will be explained presently.

When it is desired to check another transverse strip or zone of the surface 7, the support 4 is shifted on its bearings 3 transversely across the base 1 so as to bring the desired strip or zone of the surface 7 beneath the roller 24, and then the roller 24 is again rolled transversely across the vane 6 while remaining in contact therewith, which gives the sleeve 22 vertical and horizontal movements. Thus any transverse zone or strip of the surface 7 of the object or vane 6 may be brought into position to be checked by merely shifting the support 4 across the base 2.

Figure 3:
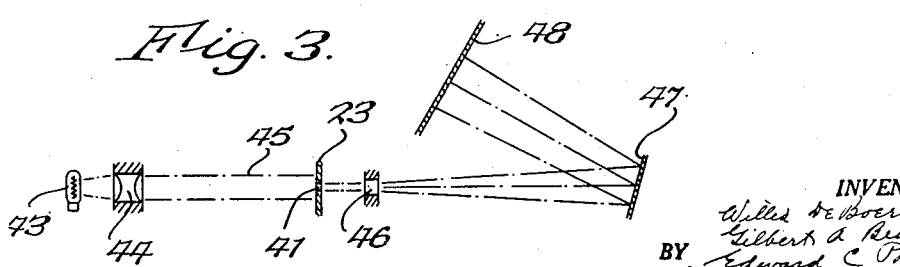
Fig. 3 is a diagram illustrating the principle of the optical projection system which is employed.

Referring now to Fig. 3 which indicates a typical, simple optical projection system, a source of light 43 is placed in front of a suitable lens 44 which directs the light from the source as a beam 45 toward a diverging lens 46. Arm 23 is disposed between the lenses 44 and 46 with the sight apertures 41 and 42 moving across the beam so that the light, in passing through either or both of the apertures 41 and 42 will create profile or shadow images which are enlarged by the lens 46. The enlarging beam from the lens 46 is reflected by a mirror 47 upon a translucent screen 48, and the index images as magnified, appear on the screen. The screen carries on the image face thereof one or more drawings which represent the character of the surface desired, or the curvature of a particular strip of the surface 7, but on a scale magnified to the same extent as the magnification of the images of the apertures 41 and 42. There may be separate drawings representing different sections of the surface during the travel of the roller over particular strips, where the surface is so long that the profile or shadow image created by one aperture in the arm 23 would move off the screen before the surface 7 had been completely traversed. Only one aperture 41 or 42 is required where the surface to be checked is small and there is no danger of the index image moving off the screen as the roller or follower moves over the surface. There may be more than two apertures 41 and 42 arranged in succession, so that as the image of one moves off the screen, the image of another aperture moves on the screen. A part of such a screen is shown in Fig. 2 and it has upon it one drawing 49 which represents the left-hand section of the surface 7 when the surface has the desired accuracy, and also has a second drawing 50 which represents the right-hand part of the curvature 7 in the strip over which the follower 24 moves. These drawings 49 and 50 are preferably formed of two lines equally spaced representing the permissible limits of tolerance in the accuracy of the surface 7, magnified, of course, to the same extent as the magnification of the image.

The drawings 49 and 50 are so placed on the screen that when the follower moves over the surface 7, the images of the apertures 41 and 42 will, if the surface is perfect, be tangent to a medium between the two lines of the related drawing, and if the periphery of the image is outside of the space between the two lines forming the related drawing, that is a sure indication that the surface is not sufficiently accurate and must be discarded. Since the sight index in the illustrated example is an aperture in the path of the beam, there will be a dark area on the screen having therein a circular area of light caused by the light rays which pass through the aperture. Therefore the image will be a light, circular area surrounded by a dark area, and it is the position of the periphery of this light area with respect to the pair of lines representing the related drawing as the images move across the screen that indicates to the observer whether or not the portion of the surface representd by that drawing is sufficiently accurate. On the screen the light area 51 is the profile image of the aperture 41, and the light area or spot 52 is the profile image of the aperture 42. If the roller or follower 24 moves over the surface 7 from left to right in Fig. 1, the light spot 52 representing the image of the aperture 42 will move from left to right across the screen along the drawing 49, and as the carriage having the post 19 is moved to the right in Fig. 1 with roller 24, the observer watches the light spot 52, and if an edge thereof remains between the spaced lines forming the drawing 49 and crosses only the upper of those lines, throughout the full travel, then it is obvious that the left-hand portion of the surface 7 which is traversed by the roller 24 is accurate within the desired limits. Before the aperture 42 moves out of the beam of light, the aperture 41 enters the light beam, and the second light spot 51 appears at the left of the screen before the light spot 52 leaves the right of the screen. The light spot 51 will move along the drawing 50 and if an edge of the image or spot 51 remains between the lines forming the drawing 50 and crosses only the upper line, then the right-hand portion of the surface 7 is accurate within the desired limits. In order to avoid having the drawings 49 and 50 so close together as to raise danger of confusion as to which drawing lines to refer to in following the path of the image across the screen, the apertures 41 and 42 may be arranged at different levels above the base 2 as shown, and in that case the drawings 49 and 50 should be at different levels where no confusion is likely.

For different transverse strips of the surface 7, the support 4 will be shifted endwise until that strip is beneath the roller 24, and the screen will have additional charts or drawings corresponding to the curves of different strips. Unless more than one sight aperture is required for relatively long surfaces, one aperture may be used for one strip or zone of the surface 7 and another aperture for another strip, or different screens with different drawings may be used for different zones or strips of the surface 7. The apertures should preferably be of the same size as the roller for maximum accuracy, because if the light spot or image of each aperture represents the same magnification as the drawing, then as the image moves along the line, different portions of the periphery of the image may be between the lines forming the drawing, as when following the drawing 50 for example, yet there will be no inaccuracy where the images are circular.

The follower which moves over and in contact with the surface 7 to be checked may be a pointed or other index figure, in which case the index sights, instead of being apertures would be similarly shaped pointers projecting from the arm 23 across the beam, but the roller is preferable, in many instances, because greater accuracy is obtained in following surfaces having substantial changes in curvature or direction and, of course, when the roller is used, the sight index should preferably be an aperture of the same size of the roller.

It will also be understood that more than two sight apertures may be employed in the arm 23, and different drawings on the screen will be used for the different apertures. The table 1 mounting the base 2 is shifted by the usual mechanism of the comparing machine in setting up the work, so that when the object is mounted on the cradle 5, the beam of light will be directed against the desired sight index, such as the apertures 41 and 42. It will be observed that with this apparatus it is possible to accurately check, by optical comparison means, the accuracy of any surface, even when such surface is so hidden that a direct silhouette of that surface cannot be projected upon the screen, and different zones or strips of the surface may be checked in succession by simple movements and without remounting the object under inspection. Other constructions for mounting and guiding the roller or follower over the surface may be employed instead of the particular construction shown, within the broader scope of the invention, but the sight index or indices such as the apertures 41 and 42 should be connected to the roller or follower so that any movement of the roller in following the surface will produce a similar, corresponding and preferably equal movement of the sight index or indices at a position where an image of the index or indices can be projected upon the screen for comparison with the drawing on the screen.

It will be understood that various changes in the details, materials and arrangements of parts, which have been herein described and illustrated in order to explain the nature of the invention, may be made by those skilled in the art within the principle and scope of the invention, as expressed in the appended claims.

We claim:

1. In an optical comparing device of the type in which a magnified image of some portion of an object created by a beam of light is projected upon a screen for comparison of the image with a chart carried by the screen, that improvement by which an optical comparison with a chart may be made of a surface of such object for which no direct silhouette may be formed, which comprises a support for said object with said surface exposed, a carriage, means mounting said carriage and support for relative movement generally in the direction of progression of the surface to be compared considered in a transverse plane through said surface, an element mounted on said carriage for movement thereon in a direction crosswise of the carriage travel and parallel to said plane, a roller carried by said element in a position to roll on said surface as said carriage moves and to control the movements of said element as it follows said surface, said element having a circular aperture of the same diameter as said roller, whereby when the apertured portion of said element is disposed across the light beam of the comparing device, and is also movable across the beam during said relative movement, with the roller engaging said surface, relative movement of said support and carriage will cause movements of said apertured portion across said beam to cause the projection of a moving circular area of light across the chart of said screen, the path of said circular area on said beam representing the magnified path of said roller as it rolls over said surface.

2. In an optical comparing device of the type in which a magnified image of some portion of an object, created by a beam of light falling on said object, is projected upon a screen for comparison of the image with a chart on said screen, that improvement which comprises a support for said object exposing that surface to be compared, a follower for engaging said surface, an element carrying said follower, a carriage mounting said element for movement in one direction in a plane crosswise of the optical axis of said beam adjacent to said object to cause said follower to contact with said surface, means yieldingly and continuously urging said follower into contact with said surface, and means mounting said element and support for relative movement in a direction crosswise of said one direction and in said plane to cause said follower to move over said surface while in contact therewith at the zone where comparison is desired when said mounting means is moved crosswise of said one direction, said element having a sight therein movable across said beam of light during said relative movement between said element and support, whereby a magnified image of the sight will move across said screen, during such relative movement, in a path representing a magnification of the path of movement of said follower while the latter moves over said surface, and by comparison of said path with a chart on said screen, the variation of said surface from said chart will be visualized.

3. In an optical comparing device of the type in which a magnified image of some portion of an object, created by a beam of light falling on said object, is projected upon a screen for comparison of the image with a chart on said screen, that improvement which comprises a support for said object exposing that surface to be compared, a follower for engaging said surface, means mounting said follower for movement toward and from said surface at the zone where comparison is desired, but in one direction in a plane crosswise of the axis of said beam adjacent to said object, means for causing relative movement between said mounting means and said support in another direction in said plane but in the general direction of progression of the curve formed by the intersection with said surface at said zone of a plane generally normal to said surface zone, and a sight movable with said follower and disposed across said beam of light during the relative movement of said follower over said surface, whereby a magnified image of the sight will move across said screen during said relative movement in a path representing a magnification of the path of movement of said follower in moving across said surface.

4. In an optical comparing device of the type in which a magnified image of some portion of an object, created by a beam of light falling on said object, is projected upon a screen for comparison of the image with a chart on said screen, that improvement which comprises a support for said object, a follower for engaging said surface, means mounting said follower and support for relative movement of said follower over said surface, in all directions in a common plane at the zone where the accuracy is to be checked, and a sight spaced from the follower and movable with said follower and disposed and movable in all directions in a common plane transversely across said beam of light during such movement of the follower over said surface, whereby a magnified profile image of the sight will move across said screen, during said movement of said follower, in a path corresponding to a magnification of the path of movement of said follower over said surface.

5. An optical comparison device comprising a support for detachably mounting in an object having a surface to be checked, means mounting said support for movement in one direction, a carriage mounted for movement in a direction crosswise of the direction of movement of said support, an element mounted on said carriage for movement crosswise of the direction of movement of both support and carriage but in the same plane with said crosswise direction, said element having an arm extending laterally therefrom and at its free end carrying a follower for engagement with the surface of said object at the zone where the surface is to be checked, whereby when said carriage is moved toward and from said support, said element will move on the carriage as said follower moves over and in contact with said surface, said arm having a sight index movable therewith, a screen having thereon a line representing the magnified profile of said surface as desired, and means for projecting upon said screen, by a light beam having an optical axis generally parallel to said one direction a profile image of said sight index at the same magnification as the profile line carried by said screen, whereby a comparison on the screen of the successive positions of the index with said line will indicate deviations of said surface from the desired surface of said object.

6. The comparison device substantially as set forth in claim 5 having a roller serving as the follower and disposed to roll over the surface in the direction of travel of the carriage, and said sight index being an aperture disposed in a plane normal to the axis of rotation of said roller and crosswise of the beam of light which forms its profile image, said aperture being of the same size as said roller.

7. An optical comparison device comprising a support for detachably mounting an object having a surface whose accuracy is to be checked, a roller, means for rolling said roller over and in contact with said surface along the line of said surface which is to be checked while the object is on said support and which line is in one plane, said moving means carrying a plurality of sight apertures spaced away from said roller but in planes normal to the axis of rotation of said roller, each screen having thereon lines representing successive sections of a line corresponding to a magnified profile image of said surface when correct, and means for projecting upon said screen, by a light beam generally parallel to said axis of rotation, profile images of said apertures at the same magnification as said line sections carried by the screen, whereby a comparison on the screen of the successive positions of said aperture images with said line sections will indicate deviations of said surface from the correct surface indicated by said screen lines.

8. An optical comparison device comprising a support for detachably mounting an object having a surface whose accuracy is to be checked, a follower engageable with said surface to be checked, an arm mounting said follower and having spaced from said follower and from each other a plurality of sight indices, means mounting said arm for movement in directions toward and from and also along said surface, all of said directions being in a common plane, so as to follow the surface when said arm is moved over the strip of said surface whose accuracy is to be checked, a screen having thereon lines representing, on a magnified scale, successive sections of the strip of said surface to be checked, and means for optically projecting upon said screen profile images of said sight indices at the same magnification as said lines carried by the screen, with the indices moving transversely across the light beam by which the images are projected on the screen, whereby during a movement of said follower over said surface, magnified images of said indices will move across the screen, and a comparison on the screen of the successive positions on the indices with said line sections will indicate deviations of said surface along said strip from a desired surface indicated by the magnified lines on said screen.

9. An optical comparison device comprising a support on which may be mounted an object with a surface to be checked, a carriage mounted for movement on said support in the direction of progression of a strip of said surface whose accuracy is to be checked, an element floatingly mounted on said carriage for movement crosswise of said direction of progression and having an arm extending therefrom towards said surface and terminating in a follower engaging said surface at said strip to be checked, whereby said follower may be maintained in contact with said surface as said carriage moves on said support, said element carrying a sight index spaced from said follower, a screen having thereon a line representing on a magnified scale a section of said surface to be checked, and means for projecting upon said screen a profile image of said sight index at the same magnification as said line, whereby a comparison on the screen of the successive positions of the sight index with the line on the screen will indicate deviations of said surface along said strip from the desired surface indicated by the line of the screen.

10. An attachment for optical comparison devices of the type which project by a beam of light, a profile image of an edge of an object, on a magnified scale, upon a screen for comparison with a standard chart on said screen representing the desired shape and size of said edge, which comprises a base for mounting on the comparing device, a support mounted on said base for movement in a direction generally parallel to the beam of light, and formed for detachably mounting an object having a surface to be checked, a carriage also mounted on said base for movement toward and from said support and having an upstanding post, an element movable vertically on said post and having an arm extending therefrom towards said support and upon its free end carrying a follower for engagement with said surface, and a sight index carried by said element in the path of said beam of light, whereby a profile image of said index will be projected on the screen of the comparing device.

11. An attachment for optical comparison devices of the type which project by a beam of light, a profile image of an edge of an object, on a magnified scale, upon a screen for comparison with a standard chart on said screen representing the desired shape and size of said edge, which comprises a base for mounting on the comparing device, a support mounted on said base for movement in a direction generally parallel to the beam of light, and formed for detachably mounting an object having a surface to be checked, a carriage also mounted on said base for movement toward and from said support and having an upstanding post, and an element movable vertically on said post and having an arm extending therefrom towards said support and terminating in a roller engageable with and rolling on said surface and having its axis of rotation generally parallel to the direction of travel of the support, said element also having an aperture of the size of said roller and in a plane transverse to the axis of the roller and to the beam of light, whereby the beam of light will project a profile image of said aperture on said screen, which image will move across the screen as said carriage moves towards and from the support with the roller in contact with said surface.

12. An attachment for optical comparison devices of the type which project by a beam of light, a profile image of an edge of an object, on a magnified scale, upon a screen for comparison with a standard chart on said screen representing the desired shape and size of said edge, which comprises a base for mounting on the comparing device, a support mounted on said base for movement in a direction generally parallel to the beam of light, and formed for detachably mounting an object having a surface to be checked, a carriage also mounted on said base for movement toward and from said support and having an upstanding post, and an element movable vertically on said post and having an arm extending therefrom towards said support and terminating in a roller engageable with and rolling on said surface and having its axis of rotation generally parallel to the direction of travel of the support, said arm having a plurality of spaced apertures of the same size as said roller in planes normal to the rolling axis of the roller, whereby profile images of said apertures may be projected on the screen of the comparing device and will move across the screen in succession as said roller rolls upon said surface.

13. An attachment for optical comparison devices of the type which project by a beam of light, a profile image of an edge of an object, on a magnified scale, upon a screen for comparison with a standard chart on said screen representing the desired shape and size of said edge, which comprises a base for mounting on the comparing device, a support mounted on said base for movement in a direction generally parallel to the beam of light, and formed for detachably mounting an object having a surface to be checked, a carriage also mounted on said base for movement toward and from said support and having an upstanding post, an element movable vertically on said post and having an arm extending therefrom towards said support and upon its free end carrying a follower for engagement with said surface, a sight index carried by said element in the path of said beam of light, whereby a profile image of said index will be projected on the screen of the comparing device, said upright post being tubular and open at its upper end, and said element telescoping over said post and guided vertically thereby, a sheave carried by said post adjacent its upper end, a flexible cord connected to said element and passing upwardly therefrom over said sheave and into the interior of said post, and a weight on the end of said cord within said post, whereby part of the weight of said element and said arm will be counter-balanced.

14. In a device having relatively moving, interfitting parts, the combination of a rail having ball-bearing races in opposed faces thereof, a tubular part telescoping with said rail and formed of four strips arranged edge to edge to form a rectangle in transverse cross section, the end pieces of the rectangle abutting against the same face of one of the side pieces, detachably coupled thereto and having opposed ballbearing races cooperating with the races of said rail, the other side piece being interposed between the margins of said end pieces, ball-bearing in said races, and screws passing through the end pieces with the ball races into said interposed side piece for coupling them, one of said end pieces having a rib on the portion of its face abutting the edge of said interposed side member, and parallel to the outside face of said interposed piece, and the interposed side piece having a similar groove into which said rib extends and fits, whereby by machining the grooved edge of said interposed side piece and tightening the screw between the end piece with the rib and said interposed side piece, the space between the outside bearing raceways may be decreased to eliminate play in the bearings between the rail and said telescoping part.

15. In a device having relatively moving, interfitting parts, the combination of a rail having ball-bearing races in opposed faces thereof, a member extending along said faces and having ball-bearing races cooperating with the races in side rail, ball-bearings in said races, said member having a plurality of pieces, one of which has one of the ball-bearing races therein and an adjoining piece having an edge face abutting flat against that face of said one piece which has therein a ballbearing race, said edge face having a longitudinally extending channel therein and the abutting portion of said one piece having a longitudinally extending rib fitting said channel but terminating in spaced relation to the bottom thereof, and screws passing from said one piece into the abutting edge of said adjoining piece, whereby by machining off said edge face and tightening said screws, the distance between the raceways of said member may be decreased to eliminate play in the bearings between the rail and member.

16. An accessory for optical comparison devices of the type which project by a beam of light, a profile image of a surface of an object, on a magnified scale, upon a screen, for comparison there with a standard chart on said screen representing on said magnified scale, the desired shape and size of said profile, which comprises a support on which said object is removably mounted, an element having a member mounted for back and forth movement thereon, said element and support being mounted for relative movement in a direction parallel to a plane transverse to said surface that defines, by the section of said body created by said plane, the profile to be compared with said chart, and also being transverse to said beam of light, said member having its back and forth movement also transverse to said beam of light and crosswise of said relative movement between said element and said support, said member having a follower running on and following said surface along said section of the body, as said element and support partake of said relative movement, and a reference index carried by said member in said beam of light for movement in all directions crosswise of the optical axis of said beam caused by said movement of said member in following said surface during said relative movement of element and support.

17. In an optical comparison device for comparing a profile of a surface strip of a body with a chart representing the desired surface strip therefor, the combination of a support to which said body is removably secured, an element, mounting means for said element and support and guiding them for relative movement in a direction toward and from each other and parallel to a plane intersecting said surface strip and approximately normal thereto, a member mounted on said element for movement back and forth in a direction crosswise of said relative movement but in a plane parallel to a plane containing both of said directions, a follower connected to and moving with said member and engaging with and following over said strip during said relative movement, an index movable with said member during its movement, and means cooperating with said index for visually defining a line, corresponding to the surface of said strip over which said follower was moved, for visual comparison with said chart.

18. In an optical comparison device for comparing a profile of a surface strip of a body with a chart representing the desired surface strip therefor, the combination of a support to which said body is removably secured, an element, mounting means for said element and support and guiding them for relative movement in a direction toward and from each other and parallel to a plane intersecting said surface strip and approximately normal thereto, a member mounted on said element for movement back and forth in a direction crosswise of said relative movement but in a plane parallel to a plane containing both of said directions, a follower connected to and moving with said member and engaging with and following over said strip during said relative movement, an index movable with said member during its movement, means cooperating with said index for visually defining a line, corresponding to the surface of said strip over which said follower was moved for visual comparison with said chart, said support and element being also relatively movable to shift said follower along said surface selectively into engagement with different surface strips.

WILLIS DE BOER.
GILBERT A. BETTS.
EDWARD C. POLIDOR.

REFERENCES CITED

The following references are of record in the file of this patent:

UNITED STATES PATENTS

| Number | Name | Date |
| --- | --- | --- |
| 1,157,796 | Morehouse | Oct. 26, 1915 |
| 2,192,529 | Thomas et al. | Mar. 5, 1940 |
| 2,400,942 | Milner | May 28, 1946 |

FOREIGN PATENTS

| Number | Country | Date |
| --- | --- | --- |
| 276,266 | Italy | Sept. 17, 1930 |
| 547,007 | Great Britain | Aug. 10, 1942 |